(12) United States Patent
Young et al.

(10) Patent No.: US 11,831,556 B2
(45) Date of Patent: Nov. 28, 2023

(54) SYSTEMS AND METHODS FOR TRANSPORT BASED NETWORK SLICING ORCHESTRATION AND MANAGEMENT

(71) Applicant: Verizon Patent and Licensing Inc., Basking Ridge, NJ (US)

(72) Inventors: Kristen Sydney Young, Morris Plains, NJ (US); Prasad Deviprasad, Cary, NC (US); Hans Raj Nahata, New Providence, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 182 days.

(21) Appl. No.: 16/848,109

(22) Filed: Apr. 14, 2020

(65) Prior Publication Data
US 2021/0320878 A1    Oct. 14, 2021

(51) Int. Cl.
| | |
|---|---|
| *H04L 47/10* | (2022.01) |
| *G06N 20/00* | (2019.01) |
| *H04W 28/10* | (2009.01) |
| *H04L 47/283* | (2022.01) |
| *H04L 47/12* | (2022.01) |
| *H04L 47/625* | (2022.01) |
| *H04W 28/08* | (2023.01) |

(52) U.S. Cl.
CPC ............. *H04L 47/29* (2013.01); *G06N 20/00* (2019.01); *H04L 47/12* (2013.01); *H04L 47/283* (2013.01); *H04L 47/626* (2013.01); *H04W 28/0975* (2020.05); *H04W 28/10* (2013.01)

(58) Field of Classification Search
None
See application file for complete search history.

(56) References Cited

U.S. PATENT DOCUMENTS

| | | | |
|---|---|---|---|
| 2003/0149685 A1* | 8/2003 | Trossman | G06F 11/3055 |
| 2014/0269269 A1* | 9/2014 | Kovvali | H04W 24/04 370/229 |
| 2018/0278466 A1* | 9/2018 | McCormick | H04L 41/0654 |
| 2019/0149397 A1* | 5/2019 | Celozzi | H04L 41/0686 370/228 |
| 2019/0356535 A1* | 11/2019 | Li | H04L 41/0631 |
| 2020/0084667 A1* | 3/2020 | Ruffini | H04W 28/10 |
| 2021/0045046 A1* | 2/2021 | Mukherjee | H04W 4/029 |

(Continued)

FOREIGN PATENT DOCUMENTS

| | | | | |
|---|---|---|---|---|
| CA | 2883659 A1 * | 3/2014 | .......... | H04L 41/082 |
| WO | WO-2019210946 A1 * | 11/2019 | | |

*Primary Examiner* — Noel R Beharry
*Assistant Examiner* — Rodrick Mak

(57) ABSTRACT

A network device obtains service requirements associated with a customer identifier, obtains a first profile describing an infrastructure design of multiple transport domains associated with at least one network slice of a network, and obtains a second profile describing performance characteristics of the multiple transport domains of the at least one network slice. The network device receives training data associated with performance measurements of the multiple transport domains of the at least one network slice, and updates a machine learning model based on the training data. The network device selects at least one of the multiple transport domains for orchestration using the updated machine learning model, the service requirements, the first profile, and the second profile.

20 Claims, 5 Drawing Sheets

(56) References Cited

U.S. PATENT DOCUMENTS

| | | | |
|---|---|---|---|
| 2021/0058473 A1* | 2/2021 | Yerli | H04L 41/5003 |
| 2021/0160153 A1* | 5/2021 | Akman | H04L 41/0896 |
| 2021/0185601 A1* | 6/2021 | Altay | H04L 47/805 |
| 2021/0224665 A1* | 7/2021 | Cheng | G06N 20/00 |
| 2021/0281592 A1* | 9/2021 | Givental | G06N 20/20 |
| 2023/0114659 A1* | 4/2023 | Taherzadeh Boroujeni | H04L 1/08 370/329 |

* cited by examiner

SYSTEMS AND METHODS FOR TRANSPORT BASED NETWORK SLICING ORCHESTRATION AND MANAGEMENT

BACKGROUND

Next Generation mobile networks have been proposed as the next evolution of mobile wireless networks. Next Generation mobile networks, such as Fifth Generation New Radio (5G NR) mobile networks, are expected to operate in various frequency ranges, including higher frequency ranges (e.g., in the gigahertz (GHz) frequency band), and to have a broad bandwidth (e.g., near 500-1,000 megahertz (MHz)). The expected bandwidth of Next Generation mobile networks is intended to support higher speed downloads. The proposed 5G mobile telecommunications standard may support more reliable, massive machine communications (e.g., machine-to-machine (M2M), Internet of Things (IoT)). Next Generation mobile networks, such as those implementing the 5G mobile telecommunications standard, are expected to enable a higher utilization capacity than current wireless networks, permitting a greater density of wireless users. Next Generation mobile networks are designed to increase data transfer rates, increase spectral efficiency, improve coverage, improve capacity, and reduce latency.

"Network Slicing" is a proposed innovation for implementation in Next Generation Mobile Networks. Network slicing is a type of virtualized networking architecture that involves partitioning of a single physical network into multiple virtual networks. The partitions, or "slices," of the virtualized network may be customized to meet the specific needs of applications, services, devices, customers, or operators. Each network slice can have its own architecture, provisioning management, and security that supports a particular application or service. Bandwidth, capacity, and connectivity functions are allocated within each network slice to meet the requirements of the objective of the particular network slice. Network slicing may be implemented in a dynamic fashion, such that the slices of the virtualized network may change over time and may be re-customized to meet new or changing needs of applications, services, devices, customers, or operators.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

The evolution of mobile networks, such as Next Generation radio networks, towards Open Radio Access Networks (RANs), virtualized RANs, and virtualized transport domains has gained momentum. Open RANs have the ability to integrate, deploy, and operate using elements (e.g., components, subsystems, and software) which are sourced from multiple different vendors, are inter-operable, and can connect over open interfaces. Virtualized RANs and virtualized transport domains involve the use of Network Functions Virtualization (NFV) and Software Defined Networks (SDNs) to virtualize a portion of the RANs and transport domains on standard Information Technology (IT) and Commercial Off-the-Shelf (COTS) hardware. Virtualized RANs and transport domains offer a number advantages, including a flexible and scalable architecture that enables dynamic load-balancing, intelligent traffic steering, and latency reduction using local caching. Virtualization of RANs and transport domains is particularly useful for implementing network slicing. Network slicing, through the use of NFV and SDNs, enables Next Generation mobile networks to offer a variety of services, which may be altered in a dynamic fashion, that demand different network performances for different types of transport sessions.

Next Generation mobile networks typically include multiple xHaul transport domains, such as, for example, fronthaul, midhaul, and backhaul transport domains, with each transport domain having its own unique and complex characteristics. "xhaul," as used herein, refers to any one of multiple different transport domains that operate to serve one or more network slices. An "xhaul" domain may include, for example, any one of a fronthaul, midhaul, and/or backhaul transport domains. Network infrastructure design may include n different xhaul transport domains (e.g., fronthaul, midhaul, and backhaul domains) that interconnect and operate to service the traffic of one or more network slices. While deploying and managing network slices for customers with specific service requirements (e.g., specific Service Level Agreements (SLAs)), determining which xHaul transport domain to orchestrate, manage, and control to optimally and most efficiently maintain those requirements becomes a complicated proposition. Exemplary embodiments described herein use machine learning and optimization techniques to select a particular xHaul transport domain for orchestration and management to ensure that transport performance for a network slice serving a particular network customer meets the customer's service requirements.

Figure 1:
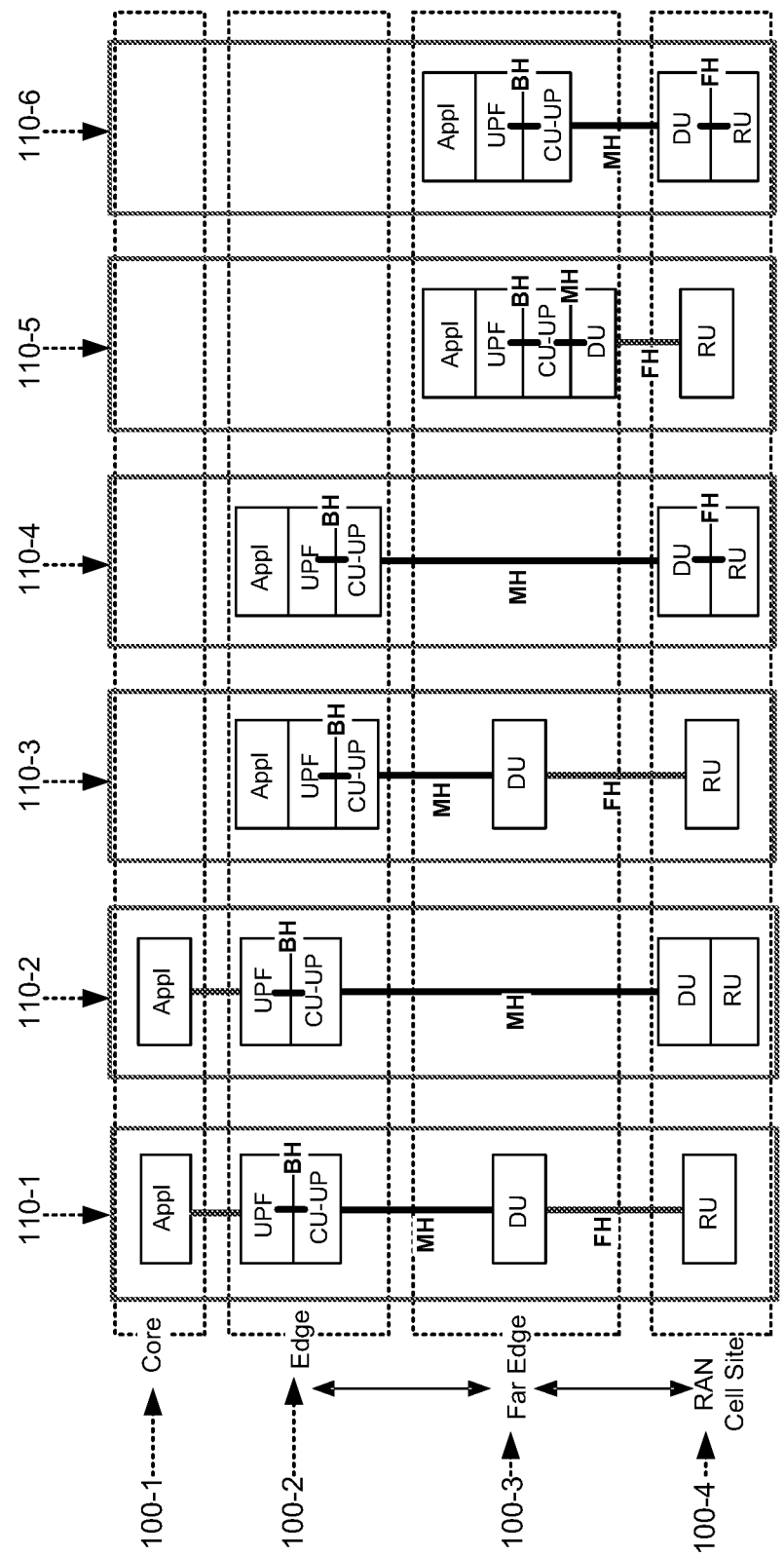
FIG. 1 illustrates examples of different network service slice infrastructure designs that may be used with exemplary embodiments described herein.

FIG. 1 illustrates examples of different network service slice infrastructure designs that may be used with exemplary embodiments described herein. As shown, the different network service slice infrastructure designs may be implemented across multiple networks, from a core network 100-1, to an edge network 100-2, to a far edge network 100-3, and out to a cell site 100-4 in a Radio Access Network (RAN). Each of the different network service slice infrastructure designs includes n different xHaul transport domains, such as, for example, backhaul, midhaul, and fronthaul transport domains, which may span the different networks shown in FIG. 1.

In a first example of a network service slice infrastructure design, shown at 110-1, an application ("Appl") resides in the core network 100-1 and connects to a User Plane Function ("UPF") in the edge network 100-2. The UPF in design 110-1 may be co-located, in edge network 100-2, with a Central Unit-User Plane (CU-UP) (e.g., at a same data center). The UPF and CU-UP in design 110-1 connect with one another via a backhaul ("BH") transport domain. The BH transport domain includes the intermediate link(s) between transport nodes (e.g., UPF) in, or close to, the core network and transport nodes (e.g., CU-UP) in one or more edge networks. The CU-UP in edge network 100-2 connects to a RAN Distributed Unit (DU) via a midhaul ("MH") transport domain located in far edge network 100-3. The MH transport domain includes the intermediate link(s) between transport nodes (e.g., CU-UPs) close to the core network and the radio controllers (e.g., DUs) in a wireless network. The DU connects to a RAN Remote Unit (RU) at the RAN cell site 100-4 via a fronthaul ("FH") transport domain. The FH transport domain includes the intermediate link(s) between the radio controllers (e.g., DUs) and the radio heads (e.g., RUs) in a wireless network.

In a second example of a network service slice infrastructure design, shown at 110-2, an application resides in the core network 100-1 and connects to a UPF in the edge network 100-2. The UPF in design 110-1 may be co-located, in edge network 100-2, with a CU-UP (e.g., at a same data center). The UPF and CU-UP in design 110-2 connect with one another via a BH transport domain. The CU-UP in edge network 100-2 connects to a DU, located at a RAN cell site 100-4, via a MH transport domain. The DU connects to a RU at the RAN cell site 100-4 via a FH transport domain. The DU and RU in design 110-2 may be co-located, at RAN cell site 100-4.

In a third low latency communication (LLC) example of a network service slice infrastructure design, shown at 110-3, an application resides in the edge network 100-2, along with the UPF and CU-UP. In the example shown, the application, UPF, and CU-UP may be co-located (e.g., at a same data center). The UPF and CU-UP in design 110-2 connect with one another via a BH transport domain. The CU-UP in edge network 100-2 connects to a DU, located in a far edge network 100-3, via a MH transport domain. The DU connects to a RU at a RAN cell site 100-4 via a FH transport domain.

In a fourth LLC example of a network service slice infrastructure design, shown at 110-4, an application resides in the edge network 100-2, along with the UPF and CU-UP. In the example shown, the application, UPF, and CU-UP may be co-located (e.g., at a same data center). The UPF and CU-UP in design 110-4 connect with one another via a BH transport domain. The CU-UP in edge network 100-2 connects to a DU, located at a RAN cell site 100-4, via a MH transport domain. DU and RU may be co-located at the RAN cell site 100-4, and may connect with one another via a FH transport domain.

In a fifth Ultra-LLC (U-LLC) example of a network service slice infrastructure design, shown at 110-5, an application resides in a far edge network 100-3, along with the UPF, CU-UP, and DU. The application, UPF, CU-UP, and DU may be co-located (e.g., in a same data center, or within multiple closely located data centers). The UPF may connect to the CU-UP via a BH transport domain, and the CU-UP may connect to the DU via a MH transport domain. The DU, in the far edge network 100-3, connects to a RU at a RAN cell site 100-4 via a FH transport domain.

In a sixth U-LLC example of a network service slice infrastructure design, shown at 110-6, an application resides in a far edge network 100-3, along with the UPF, and CU-UP. The application, UPF, and CU-UP may be co-located (e.g., in a same data center, or within multiple closely located data centers). The UPF may connect to the CU-UP via a BH transport domain. The CU-UP may connect to a DU, located in a RAN cell site 100-4, via a MH transport domain. The DU, at the RAN cell site 100-4 connects to a RU via a FH transport domain. The DU and the RU, in the design shown at 110-6, may be co-located at RAN cell site 100-4.

FIG. 1 illustrates multiple different examples of network service slice infrastructure design that may be employed herein. Other designs, however, having different configurations than those shown, may be used with the exemplary embodiments described herein.

Figure 2:
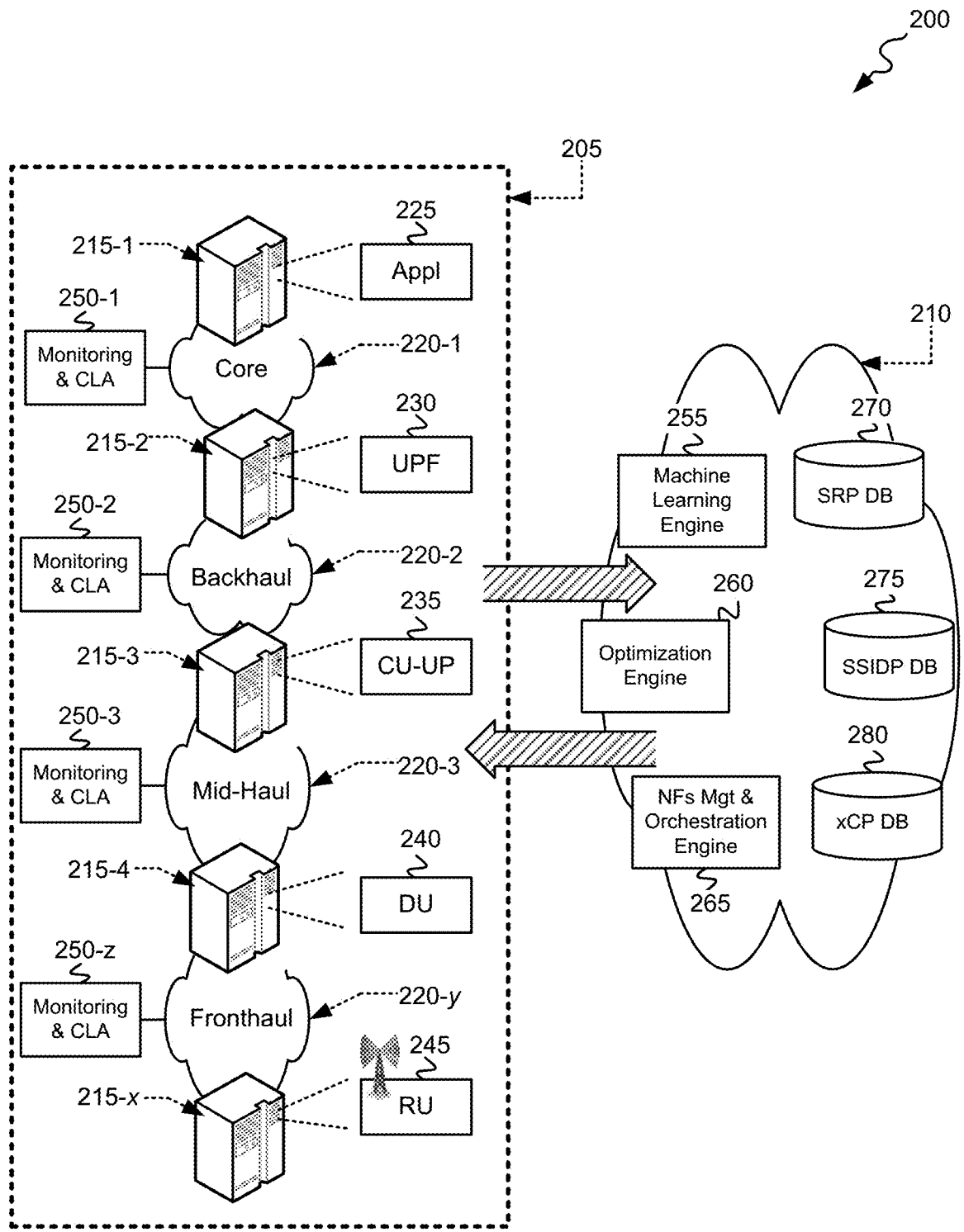
FIG. 2 illustrates an exemplary network environment in which network xHaul slicing orchestration and management, as described herein, may be implemented.

FIG. 2 illustrates an exemplary network environment 200 in which network xHaul slicing orchestration and management, as described herein, may be implemented. Network environment 200 includes a data transport section 205 and an optimization and orchestration section 210. Data transport section 205 may include multiple data centers 215-1 through 215-x, interconnected via respective transport domains 220-1 through 220-y. In the exemplary implementation shown in FIG. 2, an application 225 may be installed at data center 215-1, a UPF may be installed at data center 215-2, a CU-UP 235 may be installed at data center 215-3, a DU 240 may be installed at data center 215-4, and a RU 245 may be installed at data center 215-x.

The application 225 may include any type of application that sends data to, and/or receives data from, a user equipment device (UE) wirelessly connected to a Radio Access Network (RAN) cell site. Application 225 may be installed at data center 215-1, or in another network device connected to core transport domain 220-1. The UPF 230 includes a logical node that hosts packet routing and forwarding, policy enforcement, and data buffering functions, and includes functionality for interconnecting with an external Data Network (not shown) (e.g., the Internet). In one implementation, UPF 230 may be implemented as a Virtual Network Function (VNF) or Cloud-native Network Function (CNF) and installed at data center 215-2. The CU-UP 235 includes a logical node that hosts user plane functions, such as, for example, data routing and transport functions. In one implementation, CU-UP 235 may be implemented as a VNF or CNF and installed at data center 215-3. The DU 240 includes a logical node that hosts functions associated with the Radio Link Control (RLC) layer, the Medium Access Control (MAC) layer, and the physical (PHY) layer. In one implementation, DU 240 may be implemented as a VNF or CNF and installed at data center 215-4. The RU 245 may include at least one radio transceiver, and associated antenna(s), for RF wireless communication with one or more UEs (not shown). RU 245 may additionally include a logical node that operates and controls the at least one radio transceiver. In one implementation, the logical node of RU 245 may be implemented as a VNF or CNF and installed at data center 215-x. DU 240 and RU 245 together may be components of a New Radio (NR) Next Generation gNodeB used in the RAN of a Next Generation mobile network, such as, for example, a 5G mobile network. UEs, as referred to herein, may include any type of electronic device having a wireless capability (e.g., a Radio Frequency (RF) transceiver) to communicate with RU 245. Each of the UEs may include, for example, a computer (e.g., desktop, laptop, tablet, or wearable computer), a personal digital assistant (PDA), a "smart" phone, or a "Machine-to-Machine" (M2M) or "Internet of Things" (IoT) device. A "user" (not shown) may own, operate, and/or administer each UE.

As shown, a core transport domain 220-1 may interconnect application 225 and UPF 230, backhaul transport domain 220-2 may interconnect UPF 230 and CU-UP 235, midhaul transport domain 220-3 may interconnect CU-UP 235 and DU 240, and fronthaul transport domain 220-y may interconnect DU 240 and RU 245. Core transport domain 220-1, backhaul transport domain 220-2, midhaul transport domain 220-3, and fronthaul transport domain 220-y may each include a transport network that further includes one or more links for interconnecting respective data centers 215. In the network environment 200 of FIG. 2, data may be transported, for example, from application 225 to RU 245 (for wireless transmission to a destination UE) via UPF 230, CU-CP 235, DU 240 and via the interconnected transport domains 220-1 through 220-y. Furthermore, data (e.g., received from a UE via wireless transmission) may be transported from RU 245 to application 225 via DU 240, CU-UP 235, UPF 230 and via the interconnected transport domains 220-y through 220-1.

Transport domains 220 may further include monitoring and close loop assurance (CLA) systems 250-1 through 250-z. A respective monitoring and CLA system 250 may selectively be connected to a transport domain 220 and/or a data center 215. For example, as depicted in FIG. 2, monitoring & CLA system 250-1 may connect to core transport domain 220-1, monitoring & CLA system 250-2 may connect to backhaul transport domain 220-2, monitoring & CLA system 250-3 may connect to midhaul transport domain 220-3, and monitoring & CLA system 250-z may connect to fronthaul transport domain 220-y.

Optimization and orchestration section 210 of network environment 200 may include a machine learning engine 255, an optimization engine 260, a network functions (NFs) management and orchestration engine 265, a Service Requirements Profile (SRB) database (DB) 270, a Service Slice Infrastructure Design Profile (SSIDP) DB 275, and a xHaul Characterization Profile (xCP) DB 280. Performance and activity data, associated with the transport of data from application 225 to RU 245, or from RU 245 to application 225, may be forwarded from particular nodes in transport section 205 to machine learning engine 244 in optimization and orchestration section 210. The sources of performance and activity data may include, for example, monitoring & CLA systems 250-1 through 250-z, data centers 215-1 through 215-x, one or more nodes in core transport domain 220-1, one or more nodes in backhaul transport domain 220-2, one or more nodes in midhaul transport domain 220-3, and one or more nodes in fronthaul transport domain 220-y.

Machine learning engine 255 obtains data associated with xHaul transport domain activity and performance, and VNF or CNF activity and performance, associated with each network slice in network environment 200. Machine learning engine 255 provides the obtained data, as machine learning training data, to optimization engine 260.

Optimization engine 260 maintains, and updates, a machine learning model based on the machine learning training data received from machine learning engine 255. Optimization engine 260 uses the machine learning model to select one or more xHaul transport domains for orchestration and management based on Service Requirements Profiles (SRP) of network customers, Service Slice Infrastructure Design Profiles (SSIDPs) associated with transport domains of network slices, and xHaul Characterization Profiles (xCP) of the network slices.

Each of the SRPs describes the network service performance requirements of a network customer, including latency, throughput, reliability, availability, and/or redundancy network service requirements. Each of the SSIDPs specifies infrastructure design parameters associated with physical and virtual components of a particular network slice. The design parameters of each SSIDP may specify, for example: 1) a number of instances of VNFs/CNFs, 2) locations (e.g., Point of Presences (PoPs)) of the instances of the VNFs/CNFs, 3) location types (e.g., edge, far edge, core, cell site, etc.) of the locations of the instances of the VNFs/CNFs, 4) virtual links and/or physical links between the instances of the VNFs/CNFs, 5) built in redundancies in the infrastructure design of the multiple transport domains, and/or 6) a configuration of the multiple transport domains of the network slice. The configuration of the multiple transport domains may include design parameters that detail the physical and virtual configuration of each transport domain (e.g., fronthaul, midhaul, and backhaul) and how they interconnect. For example, referring to the examples of FIG. 1, the configuration may specify design parameters associated with the particular configuration of each of the fronthaul (FH), midhaul (MH), and backhaul (BH). Each of the xCPs includes parameters specifying actual known performance characteristics of each of the multiple transport domains. The known performance characteristics may include bandwidth, packet loss, latency (e.g., latency variability), throughput, reliability, jitter, retransmission, connectivity, and availability parameters. The performance characteristics of each of the xHaul transport domains of the network slice may, for example, be measured by a monitoring & CLA system 250.

NFs management and orchestration engine 265 receives instructions from optimization engine 260 that identify one or more xHaul transport domains and/or VNFs/CNFs to orchestrate within transport section 205. Orchestration engine 265, based on the instructions from optimization engine 260, initiates a process of orchestrating particular xHaul transport domains and/or VNFs/CNFs in transport section 205.

SRP DB 270 stores and maintains service requirement profiles for network customers. Each service requirement profile describes a particular network customer's network service performance requirements. SRP DB 270 may, for example, be searched based on a network customer identifier (ID) to retrieve a corresponding network customer's service requirement profile which specifies the network customer's required latency, throughput, reliability, availability, and/or redundancy network service parameters. SSIDP DB 275 stores and maintains Service Slice Infrastructure Design Profiles (SSIDPs) of network slices in a network. SSIDSP DB 275 may be searched, for example, using a network slice ID associated with each existing network slice in the network environment. xCP DB 280 stores and maintains xHaul Characterization Profiles (xCPs) associated with each transport domain of each network slice. xCP DB 280 may be searched, for example, using an xHaul ID and network slice ID associated with each transport domain within a particular network slice.

The configuration of network components of network environment 200 shown in FIG. 2 is for illustrative purposes. Other configurations may be implemented. Therefore, network environment 200 may include additional, fewer and/or different components, that may be configured in a different arrangement, than that depicted in FIG. 2. For example, though application 225, UPF 230, CU-UP 235, DU 240, and RU 245 are shown as being installed at different data centers 215, one or more of application 225, UPF 230, CU-UP 235, DU 240, and RU 245 may be installed at a same data center 215. Additionally, though backhaul transport domain 220-2, midhaul transport domain 220-3, and fronthaul transport domain 220-y are shown in FIG. 2 as being separate networks, that may have multiple links, in some implementations, these domains may be implemented as buses within a single data center 215, or as a short distance link (e.g., a short run of optical fiber) between two data centers 215.

Figure 3:
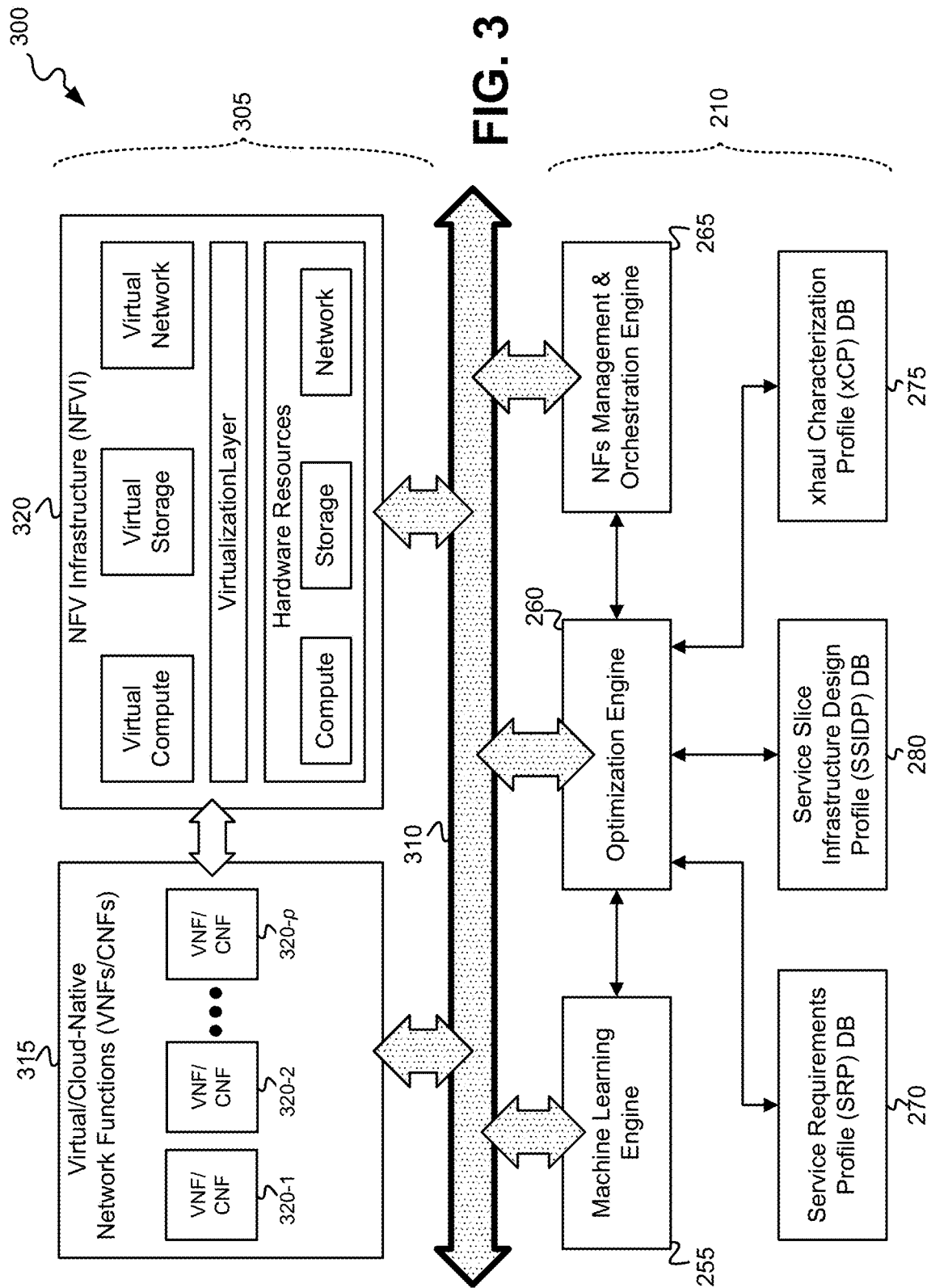
FIG. 3 illustrates a Network Functions Virtualization Infrastructure environment in which the optimization and orchestration section of the network environment of FIG. 2 manages and orchestrates Virtual Network Functions, monitoring & Closed Loop Assurance systems, and transport domains associated with the transport section of FIG. 2.

FIG. 3 illustrates a Network Functions Virtualization Infrastructure (NFVI) environment 300 in which optimization and orchestration section 210 of network environment 200 of FIG. 2 manages and orchestrates VNFs/CNFs, monitoring & CLA systems 250, and transport domains associated with transport section 205 of FIG. 2. Management and orchestration of VNFs/CNFs within NFVI environment 300 may involve installation and execution of various VNFs/CNFs at data centers 215-1 through 215-x of FIG. 2, and removal (and possible re-installation) of selected VNFs/CNFs at data centers 215-1 through 215-x. For example, UPF 230, CU-UP 235, DU 240, and RU 245 may be implemented as VNFs and/or CNFs and installed at data centers 215-1 through 215-x. As another example, UPF 230, CU-UP 235, DU 240 and/or RU 245 may be removed from a first data center 215 and re-installed in a different data center 215 at different location in a same network, or in a different network (e.g., from the core network to an edge network, from an edge network to a far edge network, etc.). NFVI environment 300 includes optimization and orchestration section 210 and a VNF/NFVI section 305.

As shown in FIG. 3, optimization and orchestration section 210 includes, as described above with respect to FIG. 2, machine learning engine 255, optimization engine 260, NFs management and orchestration engine 265, SRP DB 270, SSIDP DB 275, and xCP DB 280. VNF/NFVI section 305 includes VNFs/CNFs 315 and a NFVI 320. VNFs/CNFs 315 includes multiple VNFs/CNFs 320-1 through 320-p that may each perform various different functions in network environment 200. NFVI 320 includes a number of components, including, for example, hardware resources (e.g., compute, storage, and network resources), a virtualization layer, and virtual resources (e.g., virtual compute, virtual storage, and virtual network resources).

As shown, optimization and orchestration section 210 connects with VNF/NFVI section 305 via a bus 310. For example, machine learning engine 255, optimization engine 260, orchestration engine 265, VNFs/CNFs 315, and a NFVI 320 connect to bus 310 for the exchange of data. For example, machine learning engine 255 may receive data associated with data processing and/or data transport performed at VNFs/CNFs 320-1 through 320-p via bus 310. Machine learning engine 225 may forward the data as training data to optimization engine 260 via bus 310 or via a direct connection with optimization engine 260. Optimization engine 260 may send instructions to orchestration engine 265 via, for example, bus 310.

As shown, optimization and orchestration section 210 includes SRP DB 270, SSIDP DB 280, and xCP DB 275 interconnected with optimization engine 260. Optimization engine 260 may retrieve service requirements profiles from SRP DB 270, service slice infrastructure design profiles from SSIDP DB 280, and xHaul characterization profiles from xCP DB 275 for use in selecting particular xHaul transport domains for management and orchestration by engine 265. Optimization engine 260 may also update a model that is used for selecting the different transport domains for management and orchestration based on machine learning training data received from machine learning engine 255.

Figure 4:
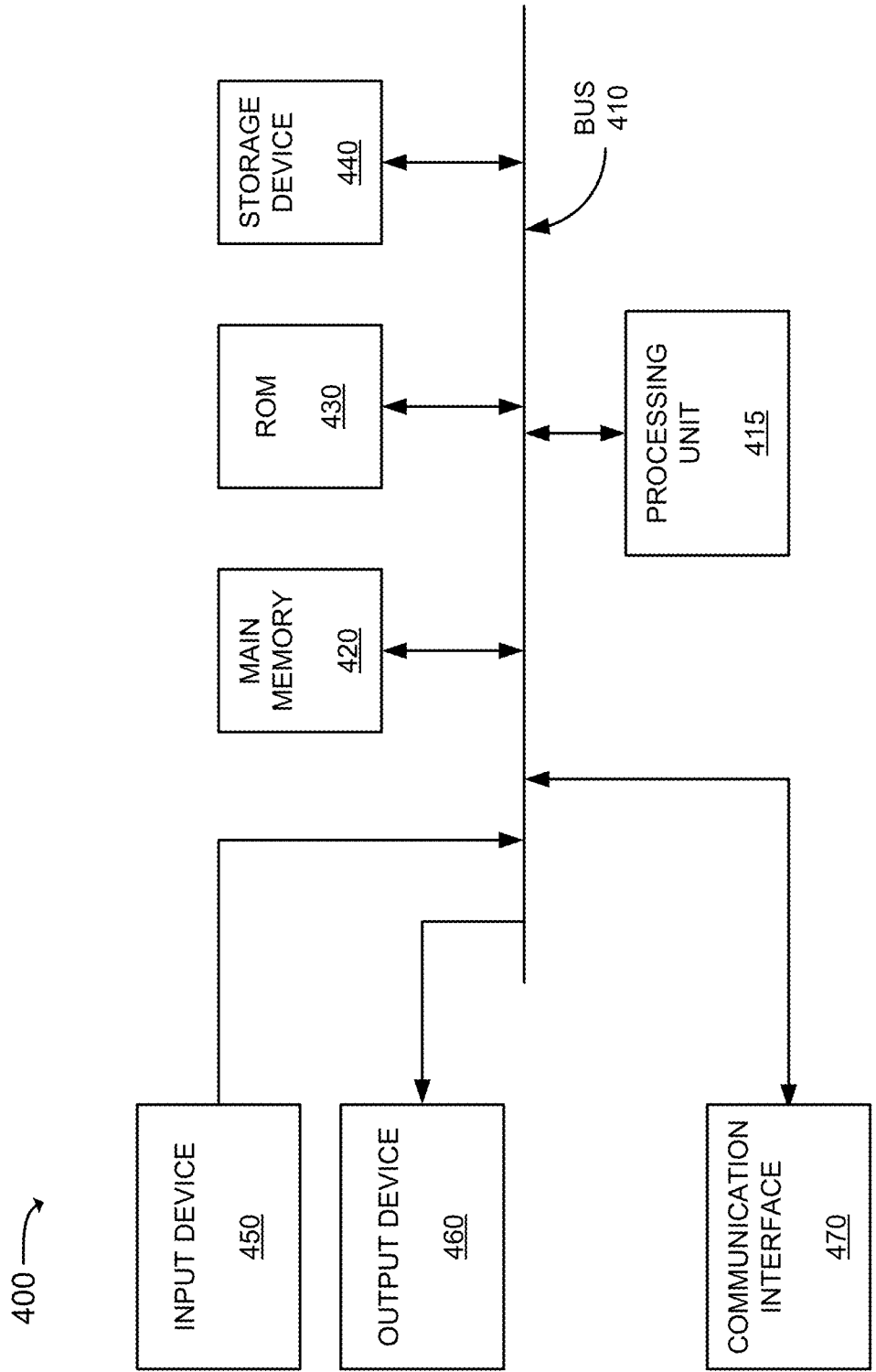
FIG. 4 is a diagram of exemplary components of a network device that may correspond to the data centers, machine learning engine, optimization engine, orchestration engine, and databases of FIGS. 2 and 3.

FIG. 4 is a diagram of exemplary components of a network device 400. Network device 400 may correspond to each of data centers 215-1 through 215-x of FIG. 2. Device 400 may further correspond to one or more of machine learning engine 255, optimization engine 260, orchestration engine 265, SRP DB 270, SSIDP DB 280, and/or xCP DB 275. In one implementation, each of machine learning engine 255, optimization engine 260, and orchestration engine 265 may be implemented by a different network device 400. In another implementation, a single network device 400 may implement machine learning engine 255, optimization engine 260, and orchestration engine 265. One or more network devices 400 may also execute the functions of VNFs/CNFs 320-1 through 320-p, the functions of NFVI 320, and the functions of application 225, UPF 230, CU-UP 235, DU 240, RU 245, and monitoring & CLA systems 250.

Network device 400 may include a bus 410, a processing unit 415, a main memory 420, a read only memory (ROM) 430, a storage device 440, an input device 450, an output device 460, and a communication interface 470. Bus 410 may include a path that permits communication among the elements of network device 400.

Processing unit 415 may include one or more processors or microprocessors which may interpret or execute stored instructions associated with one or more processes, or processing logic that implements the one or more processes. Processing unit 415 may include software, hardware, or a combination of software and hardware for executing the processes described herein. In one implementation, processing unit 415 may include programmable logic such as Field Programmable Gate Arrays (FPGAs) or accelerators. Main memory 420 may include a random access memory (RAM) or another type of dynamic storage device that may store information and, in some implementations, instructions for execution by processing unit 415. ROM 430 may include a ROM device or another type of static storage device (e.g., Electrically Erasable Programmable ROM (EEPROM)) that may store static information and, in some implementations, instructions for use by processing unit 415. Storage device 440 may include a magnetic and/or optical recording medium and its corresponding drive. Main memory 420, ROM 430 and storage device 440 may each be referred to herein as a "non-transitory computer-readable medium" or a "non-transitory storage medium."

Input device 450 may include one or more devices that permit a user or operator to input information to device 400, such as, for example, a keypad or a keyboard, a display with a touch sensitive panel, voice recognition and/or biometric mechanisms, etc. Output device 460 may include one or more devices that output information to the operator or user, including a display, a speaker, etc. Input device 450 and output device 460 may, in some implementations, be implemented as a graphical user interface (GUI) that displays GUI information and which receives user input via the GUI.

Communication interface 470 may include one or more transceivers that enable device 400 to communicate with other devices and/or systems. For example, in a case where device 400 hosts the functions of a CU-UP 235 or UPF 230, communication interface 470 may include a wired transceiver for communicating with other nodes via a transport domain, such as, for example, via backhaul transport domain 220-2 or midhaul transport domain 220-3. In implementations in which network device 400 executes the functions of a DU 240, communication interface 470 may include one or more optical transceivers for communicating with a RU 245 via optical fiber.

Device 400 may perform certain operations or processes, as may be described herein. Device 400 may perform these operations in response to processing unit 415 executing software instructions contained in a computer-readable medium, such as memory 420. A computer-readable medium may be defined as a physical or logical memory device. A logical memory device may include memory space within a single physical memory device or spread across multiple physical memory devices. The software instructions may be read into main memory 420 from another computer-readable medium, such as storage device 440, or from another device via communication interface(s) 470. The software instructions contained in main memory 420 may cause processing unit 415 to perform the operations or processes, as described herein. Alternatively, hardwired circuitry (e.g., logic hardware) may be used in place of, or in combination with, software instructions to implement the operations or processes, as described herein. Thus, exemplary implementations are not limited to any specific combination of hardware circuitry and software.

The configuration of components of device 400 illustrated in FIG. 4 is for illustrative purposes only. Other configurations may be implemented. Therefore, device 400 may include additional, fewer and/or different components, arranged in a different configuration, than depicted in FIG. 4.

Figure 5:
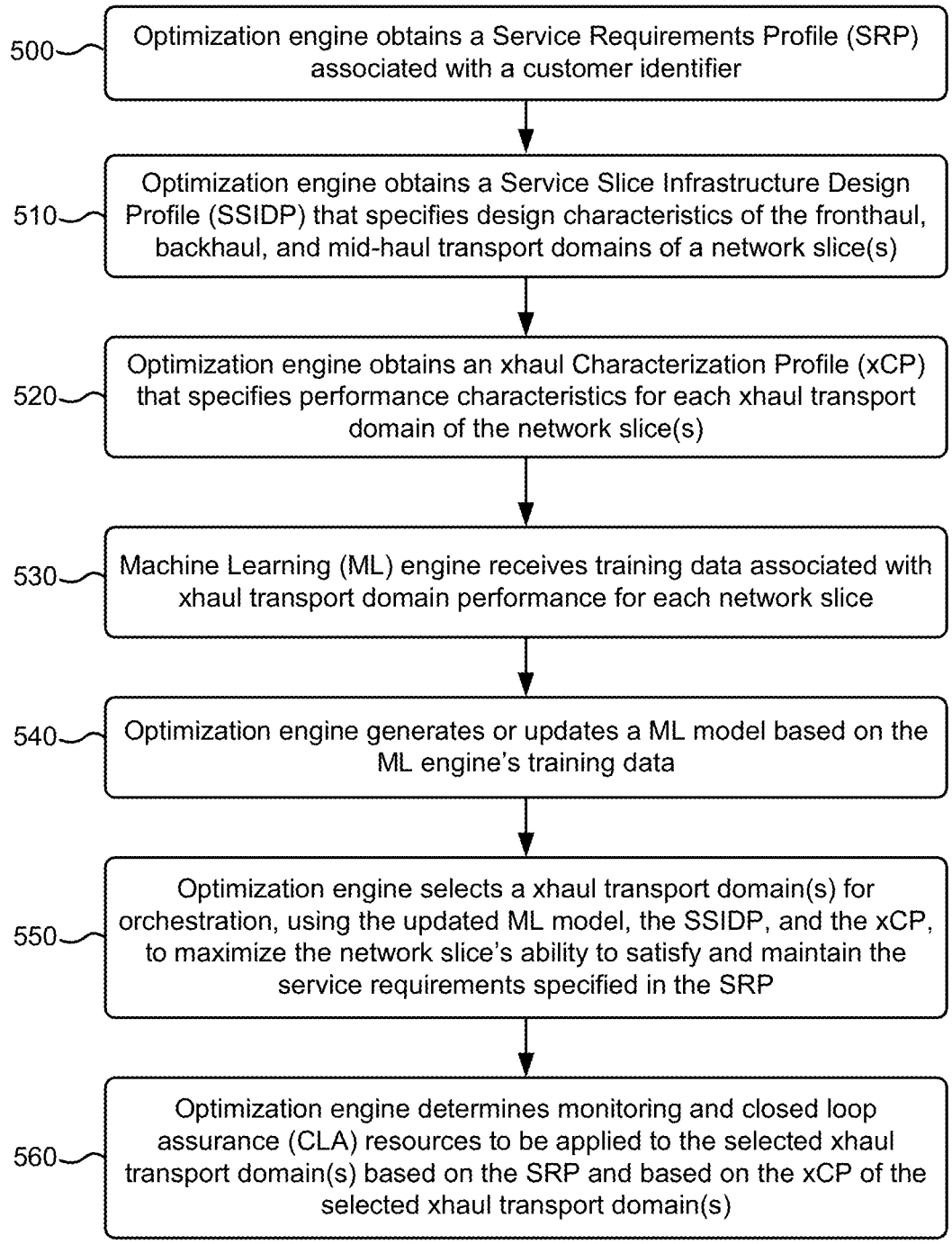
FIG. 5 is a flow diagram of an exemplary process for selecting a xHaul transport domain(s) for orchestration using a machine learning model and a service requirements profile associated with a network customer.

FIG. 5 is a flow diagram of an exemplary process for selecting an xHaul transport domain(s) for orchestration and management using a machine learning model and a service requirements profile associated with a network customer. The exemplary process of FIG. 5 may be implemented by optimization engine 260, in conjunction with machine learning engine 255 and orchestration engine 265.

The exemplary process includes optimization engine 260 obtaining a Service Requirements Profile (SRP) associated with a customer identifier (block 500). A SRP may be received from a network customer and stored in SRP DB 270 based on the network customer's customer ID. The customer ID may include an account ID, a device ID, or other type of ID associated with a particular network customer or device user. Each SRP describes the network service performance requirements of a particular network customer or device(s), including, for example, latency, throughput, reliability, availability, and/or redundancy network service requirements.

Optimization engine 260 obtains a Service Slice Infrastructure Design Profile (SSIDP) that specifies design characteristics of the front-haul, backhaul, and midhaul transport domains of a network slice(s) (block 510). Orchestration engine 265 may automatically keep track of the infrastructure design of each network slice currently implemented within the network, including generating SSIDP parameters associated with physical and virtual components of a particular network slice. The generated parameters for each network slice may be collected as data components of a SSIDP. In one implementation, each SSIDP may include parameters specifying: 1) a number of instances of virtual network functions (VNFs/CNFs), 2) locations (e.g., Point of Presences (PoPs)) of the instances of the VNFs/CNFs, 3) location types (e.g., edge, far edge, core, cell site, etc.) of the locations of the instances of the VNFs/CNFs, 4) virtual links and/or physical links between the instances of the VNFs/CNFs, 5) built in redundancies in the infrastructure design of the multiple transport domains, and/or 6) a configuration of the multiple transport domains of the network slice. The configuration of the multiple transport domains associated with the network slice may include parameters that detail the physical and virtual configuration of each transport domain (e.g., fronthaul, midhaul, and backhaul) and how they interconnect. At each instance of network slice creation and/or modification, orchestration engine 265 generates the design parameters of the xHaul transport domains (e.g., front-haul, backhaul, and midhaul transport domains) of the network slice, generates a SSIDP that captures the design parameters, and stores the generated SSIDP in SRP DB 270. Optimization engine 260 may subsequently retrieve the SSIDP for a particular network slice from SSIDP DB 275 (e.g., in block 550 below).

Optimization engine 260 obtains a xHaul Characterization Profile (xCP) that specifies performance characteristics for each xHaul transport domain of the network slice(s) (block 520). For each current (or possibly future) network slice, optimization engine 260 generates an xCP data profile that includes parameters that specify known performance characteristics of each of the multiple transport domains within the network slice. The known performance characteristics may include bandwidth, packet loss, latency (e.g., latency variability), throughput (e.g., throughput variability), reliability, jitter, retransmission, connectivity, reliability, and/or service availability parameters. The performance characteristics of each of the xHaul transport domains of the network slice may, for example, be measured by a respective monitoring & CLA system 250.

Machine learning engine 255 receives training data associated with xHaul transport domain performance for each network slice (block 530). Machine learning engine 255 receives transport domain activity and performance data from nodes in transport section 205 of network environment 200, including from VNFs/CNFs 320 that implement UPFs 230, CU-UPs 235, DUs 240, RUs 245, monitoring & CLA systems 250, and/or transport domains 220. Machine learning engine 255 supplies the received data as machine learning training data to optimization engine 260 for training its machine learning model. The training data may include parameters, associated with data transport, reported by VNFs/CNFs 320, monitoring & CLA systems 250, or nodes (e.g., UPF 230, CU-UP 235, DU 240, RU 245) within data transport section 205. The data transport parameters may include, for example, transport performance metrics (e.g., bandwidth, packet loss, latency, throughput, reliability, jitter, retransmissions, connectivity) measured at certain locations within data transport section 205.

Optimization engine 260 generates or updates a machine learning model based on the machine learning engine 255's training data (block 540). Optimization engine 260 receives the machine learning training data from machine learning engine 255 and continuously, or periodically, updates its machine learning model using existing machine learning algorithms, such as, for example, linear programming, logistic regression, decision tree, K-Nearest Neighbors (KNN), Random Forest, and/or boosted tree algorithms. To generate a machine learning model, or update an existing machine learning model, engine 260 identifies one or more service requirements, of the SRP of block 500, to be enforced. Using the training data of block 530, engine 260 identifies specific criteria to be taken into account for each service requirement to be enforced, where each identified criteria may correspond to a particular characteristic from the xCPs (from block 520) of each xhaul transport domain (e.g., fronthaul, midhaul, or backhaul domains) in the transport path of the network slice of the deployed infrastructure. Engine 260 further determines, based on the machine learning training data of block 530, dynamic weighting factors (WF) to apply to each identified criteria of an objective function (F):

$$F = criteria_1 WF_1 + criteria_2 WF_2 + \ldots = criteria_n WF_n \quad \text{Eqn. (1)}$$

The criteria, and weighting factors (WFs), of Eqn. (1) may be dynamically adjusted or modified (e.g., continuously or periodically) by engine 260 based on the machine learning training data.

In a simplified example in which the service requirement to be enforced is service availability (referred to herein as "availability"), the criteria to be taken into account may include a degree of vulnerability and a degree of path diversity of each xhaul transport domain. Availability relates to an amount of time that the transport infrastructure is operational during a given time period (i.e., uptime divided by total in-service time). The degree of vulnerability includes measurable indicators of vulnerability factors, such as, for example, fault likelihood, repair time, etc.). A high degree of vulnerability indicates, for example, a high fault likelihood and/or a high repair time, whereas a low degree of vulnerability indicates a low fault likelihood and/or a low repair time. The degree of path diversity includes an indication of a number of available routes across a particular xhaul domain to reach a destination. A high degree of path diversity indicates the existence of many available routes through the xhaul domain to reach a destination, whereas a low degree of path diversity indicates the existence of few (or as little as one) available routes through the xhaul domain. Other service requirements, not described in the exemplary implementation above, may be enforced through selective xhaul transport domain orchestration including, for example, latency (e.g., latency variability), throughput (e.g., throughput variability), and reliability. Variability, such as latency variability or throughput variability, indicates if a domain, or one or more links within a domain, support stable performance based on various factors, such as, for example, physical installation instability, likelihood of congestion, etc. Reliability, as referred to herein, relates to the ability of the transport infrastructure to deliver data with no more than a certain error rate (e.g., a maximum x % error rate).

Optimization engine 260 selects a xHaul transport domain(s) for orchestration, using the updated machine learning model, the SSIDP, and the xCP, to maximize the network slice's ability to satisfy and maintain the service requirements specified in the SRP (block 550). Optimization engine 260 may maximize, or minimize, the objective function F (e.g., Eqn. (1) above) of the machine learning model to determine which xHaul transport domain or domains should be selected for orchestration such that transport performance metrics within data transport section 205 satisfy the network customer's SRP service requirements. Optimization engine 260 may identify the multiple xhaul transport domains (e.g., current fronthaul, midhaul and backhaul domains) in the deployed infrastructure currently supplying network service to the network customer (e.g., of block 500), and obtain the xCPs for each identified xhaul transport domain (e.g., obtained in block 520). Optimization engine 260 uses the obtained xhaul characteristics from the xCPs and inserts them into the appropriate criteria terms ($criteria_1$, $criteria_2$, etc.) of the objective function F to select the xhaul transport domain(s) whose xhaul characteristics, if properly orchestrated, can serve to maximize or minimize the objective function F. Orchestration of a selected xhaul transport domain(s) may, for example, include: 1) instantiating a VNF(s)/CNF(s) that includes functionality for generating predictions regarding link failures within the selected xhaul domain, 2) instantiating a VNF(s)/CNF(s) for collecting performance-related data in the selected xhaul domain, 3) causing sessions (e.g., requiring high availability) in the selected xhaul domain of the network slice to be concurrently routed over multiple different paths; and/or 4) deploying one or more redundant virtual routers in the selected xhaul domain. Other orchestration actions, not described herein, may be employed to attempt to enforce the service requirements from the network customer's SRP. The orchestration actions may be executed individually, or in combination with one another (e.g., sequentially or in parallel), based on the service requirements of the SRP, the xCP of the selected xhaul domain, and/or based on other factors.

Returning to the simplified example of block 540, in which availability is the service requirement to be enforced, the current transport domain network slice infrastructure may include a midhaul WAN with a high degree of vulnerability and a high degree of path diversity, a front haul data center with a very low degree of vulnerability and a very low degree of path diversity, and a backhaul data center with a very low degree of vulnerability and a very low degree of path diversity. In this example, optimization engine 260, when maximizing the objective function using the degree of vulnerability and degree of path diversity parameters of the midhaul, fronthaul, and backhaul domains, determines that orchestration of the midhaul domain would best meet the availability service requirement of the network customer's SRP. Orchestration of the midhaul, in this example, may include the following: 1) instantiating a VNF(s) that includes functionality for generating predictions regarding link failures within the selected midhaul domain, 2) instantiating a VNF(s)/CNF(s) for collecting performance-related data in the selected midhaul domain, 3) causing sessions, requiring high availability in the selected midhaul domain of the network slice, to be concurrently routed over multiple different paths; and/or 4) deploying one or more redundant virtual routers in the selected midhaul domain.

Optimization engine 260 determines monitoring and CLA resources to be applied to the selected xHaul transport domain(s) based on the SRP and based on the xCP of the selected xHaul transport domain(s) (block 560). Optimization engine 260 may instruct orchestration engine 265 to install one or more VNFs/CNFs at one or more nodes in the selected xHaul transport domain to perform transport performance measurements (e.g., bandwidth, packet loss, latency, throughput, reliability, jitter, retransmissions, connectivity) and to supply the measured performance metrics to machine learning engine 255 via, for example, bus 310 shown in FIG. 3. In some circumstances, block 560 may optionally be omitted from the process of FIG. 5. In other circumstances, installation/instantiation of monitoring and CLA resources may be performed as part of the orchestration of the selected xhaul domain.

Though not shown in FIG. 5, blocks 530 and 540 may be executed continuously, or periodically, in parallel with other blocks of the process of FIG. 5 to obtain current machine learning training data and to update the machine learning model used in block 550.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks has been described with respect to FIG. 5, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   obtaining service requirements associated with providing a network service to a customer or device via a network;
   receiving, from a machine learning engine, training data associated with performance measurements of fronthaul, backhaul, and midhaul transport domains that service traffic of at least one network slice within the network;
   generating or updating a machine learning model based on the training data, wherein generating or updating the machine learning model comprises:
     identifying one or more of the service requirements to be enforced in the at least one network slice,
     identifying, based on the training data, performance characteristics of each of the fronthaul, backhaul, and midhaul transport domains to be taken into account for each of the identified one or more of the service requirements to be enforced in the at least one network slice, and
     generating an objective function that includes terms corresponding to the identified performance characteristics;
   selecting, for orchestration, at least one of the fronthaul, backhaul or midhaul transport domains having known performance characteristics that, when orchestrated, maximize or minimize the objective function; and
   initiating the orchestration of the selected at least one of the fronthaul, backhaul, or midhaul transport domains.

2. The method of claim 1, wherein the service requirements comprise at least one of latency, throughput, reliability, availability, and redundancy network service parameters associated with providing the network service to the customer or the device.

3. The method of claim 1, further comprising:
   obtaining a profile describing an infrastructure design of the fronthaul, backhaul, and midhaul transport domains, wherein the profile comprises design parameters that specify one or more of the following:
     a number of instances of virtual network functions (VNFs) or cloud-native network functions (CNFs),
     locations of the instances of the VNFs or CNFs,
     location types of the locations of the instances of the VNFs or CNFs,
     virtual links between the instances of the VNFs or CNFs,
     built in redundancies in the infrastructure design of the fronthaul, backhaul, and midhaul transport domains, or
     a configuration of the fronthaul, backhaul, and midhaul transport domains that service the traffic of the at least one network slice.

4. The method of claim 1, further comprising:
   obtaining a profile comprising performance parameters specifying the known performance characteristics of each of the fronthaul, backhaul, and midhaul transport domains,
   wherein the performance parameters comprise bandwidth, packet loss, latency, throughput, reliability, jitter, retransmission, connectivity, and availability parameters.

5. The method of claim 1, further comprising:
   determining monitoring and closed loop assurance (CLA) resources to be applied to the selected at least one of the fronthaul, backhaul, or midhaul transport domains based on the service requirements.

6. The method of claim 1, wherein the identified performance characteristics of the fronthaul, backhaul and midhaul transport domains comprise multiple identified performance characteristics and wherein the objective function for the machine learning model comprises a weighted function having multiple dynamic weights associated with the multiple identified performance characteristics.

7. A network device, comprising:
   a communication interface configured to communicate with at least one database; and
   one or more processors, or logic, configured to:
     obtain, from the at least one database, service requirements associated with providing a network service to a customer or device via a network,
     receive, via the communication interface from a machine learning engine, training data associated with performance measurements of the fronthaul, backhaul, and midhaul transport domains that service the traffic of the at least one network slice within the network;
     generate or update a machine learning model based on the training data, wherein generating or updating the machine learning model comprises:
       identifying one or more of the service requirements to be enforced in the at least one network slice,
       identifying, based on the training data, performance characteristics of each of the fronthaul, backhaul, and midhaul transport domains to be taken into account for each of the identified one or more of the service requirements to be enforced in the at least one network slice, and
       generating an objective function that includes terms corresponding to the identified performance characteristics;

select, for orchestration, at least one of the fronthaul, backhaul or midhaul transport domains having known performance characteristics that, when orchestrated, maximize or minimize the objective function; and initiate the orchestration of the selected at least one of the fronthaul, backhaul, or midhaul transport domains.

8. The network device of claim 7, wherein the service requirements comprise at least one of latency, throughput, reliability, availability, and redundancy network service parameters associated with providing the network service to the customer or the device.

9. The network device of claim 7, wherein the one or more processors, or logic, is further configured to:

obtain a profile describing an infrastructure design of the fronthaul, backhaul, and midhaul transport domains, wherein the profile comprises design parameters that specify one or more of the following:

a number of instances of virtual network functions (VNFs) or cloud-native network functions (CNFs), locations of the instances of the VNFs or CNFs, location types of the locations of the instances of the VNFs or CNFs, virtual links between the instances of the VNFs or CNFs, built in redundancies in the infrastructure design of the fronthaul, backhaul, and midhaul transport domains, or a configuration of the fronthaul, backhaul, and midhaul transport domains that service the traffic of the at least one network slice.

10. The network device of claim 7, wherein the one or more processors, or logic, is further configured to:

obtain a profile comprising performance parameters specifying the known performance characteristics of each of the fronthaul, backhaul, and midhaul transport domains, wherein the performance parameters comprise bandwidth, packet loss, latency, throughput, reliability, jitter, retransmission, connectivity, redundancy, and availability parameters.

11. The network device of claim 7, wherein the one or more processors, or logic, are further configured to:

determine monitoring and closed loop assurance (CLA) resources to be applied to the selected at least one of the fronthaul, backhaul, or midhaul transport domains based on the service requirements.

12. The network device of claim 7, wherein the identified performance characteristics of the fronthaul, backhaul and midhaul transport domains comprise multiple identified performance characteristics and wherein the objective function for the machine learning model comprises a weighted function having multiple dynamic weights associated with the multiple identified performance characteristics.

13. A non-transitory storage medium storing instructions executable by a network device, wherein the instructions comprise instructions to cause the network device to:

obtain service requirements associated with providing a network service to a customer or device via a network;

receive, from a machine learning engine, training data associated with performance measurements of fronthaul, backhaul, and midhaul transport domains that service traffic of at least one network slice within the network;

generate or update a machine learning model based on the training data, wherein generating or updating the machine learning model comprises:

identifying one or more of the service requirements to be enforced in the at least one network slice, identifying, based on the training data, performance characteristics of each of the fronthaul, backhaul, and midhaul transport domains to be taken into account for each of the identified one or more of the service requirements to be enforced in the at least one network slice, and generating an objective function that includes terms corresponding to the identified performance characteristics;

select, for orchestration, at least one of the fronthaul, backhaul or midhaul transport domains having known performance characteristics that, when orchestrated, maximize or minimize the objective function; and initiate orchestration of the selected at least one of the fronthaul, backhaul, or midhaul transport domains.

14. The non-transitory storage medium of claim 13, wherein the instructions further comprise instructions to cause the network device to:

obtain a first profile describing an infrastructure design of the fronthaul, backhaul, and midhaul transport domains, wherein the first profile comprises design parameters that specify one or more of the following:

a number of instances of virtual network functions (VNFs) or cloud-native network functions (CNFs), locations of the instances of the VNFs or CNFs, location types of the locations of the instances of the VNFs or CNFs, virtual links between the instances of the VNFs or CNFs, built in redundancies in the infrastructure design of the fronthaul, backhaul, and midhaul transport domains, or a configuration of the fronthaul, backhaul, and midhaul transport domains that service the traffic of the at least one network slice, obtain a second profile comprising performance parameters specifying the known performance characteristics of each of the fronthaul, backhaul, and midhaul transport domains, wherein the performance parameters comprise bandwidth, packet loss, latency, throughput, reliability, jitter, retransmission, connectivity, and availability parameters, and wherein the service requirements comprise a third profile that describes at least one of latency, throughput, reliability, availability, and redundancy network service parameters associated with providing the network service to the customer or the device.

15. The non-transitory storage medium of claim 13, wherein the instructions further comprise instructions to cause the network device to:

determine monitoring and closed loop assurance (CLA) resources to be applied to the selected at least one of the fronthaul, backhaul, or midhaul transport domains based on the service requirements.

16. The method of claim 1, wherein the network comprises a wireless network, wherein the backhaul transport domain comprises one or more intermediate first links between User Plane Functions (UPFs) and Central Unit-User Plane functions (CU-UPs) in the wireless network, wherein the midhaul transport domain comprises one or more intermediate second links between the CU-UPs and radio controllers in the wireless network, and wherein the front haul transport domain comprises one or more intermediate third links between the radio controllers and radio heads in the wireless network.

17. The method of claim 1, wherein the orchestration further comprises:

instantiating one or more virtual network functions (VNFs) or Cloud-native Network Functions (CNFs) for generating predictions regarding link failures within the selected at least one of the fronthaul, backhaul, or midhaul transport domains.

18. The method of claim 1, wherein the orchestration further comprises:

deploying one or more redundant virtual routers in the selected at least one of the fronthaul, backhaul, or midhaul transport domains.

19. The method of claim 1, wherein the orchestration further comprises:

instantiating one or more virtual network functions (VNFs) or Cloud-native Network Functions (CNFs) for collecting performance related data in the selected at least one of the fronthaul, backhaul, or midhaul transport domains.

20. The network device of claim 7, wherein the network comprises a wireless network, wherein the backhaul transport domain comprises one or more intermediate first links between User Plane Functions (UPFs) and Central Unit-User Plane functions (CU-UPs) in the wireless network, wherein the midhaul transport domain comprises one or more intermediate second links between the CU-UPs and radio controllers in the wireless network, and wherein the front haul transport domain comprises one or more intermediate third links between the radio controllers and radio heads in the wireless network.

\* \* \* \* \*